Feb. 17, 1959

I. B. McMURREN 2,874,293

REGULATED OSCILLATOR

Filed July 31, 1957

INVENTOR.
IRVING B. McMURREN,
BY
Perry E. Turner
AGENT

United States Patent Office 2,874,293

Patented Feb. 17, 1959

2,874,293

REGULATED OSCILLATOR

Irving B. McMurren, Los Angeles, Calif., assignor to Lear, Incorporated

Application July 31, 1957, Serial No. 675,467

3 Claims. (Cl. 250—36)

Figure 1:
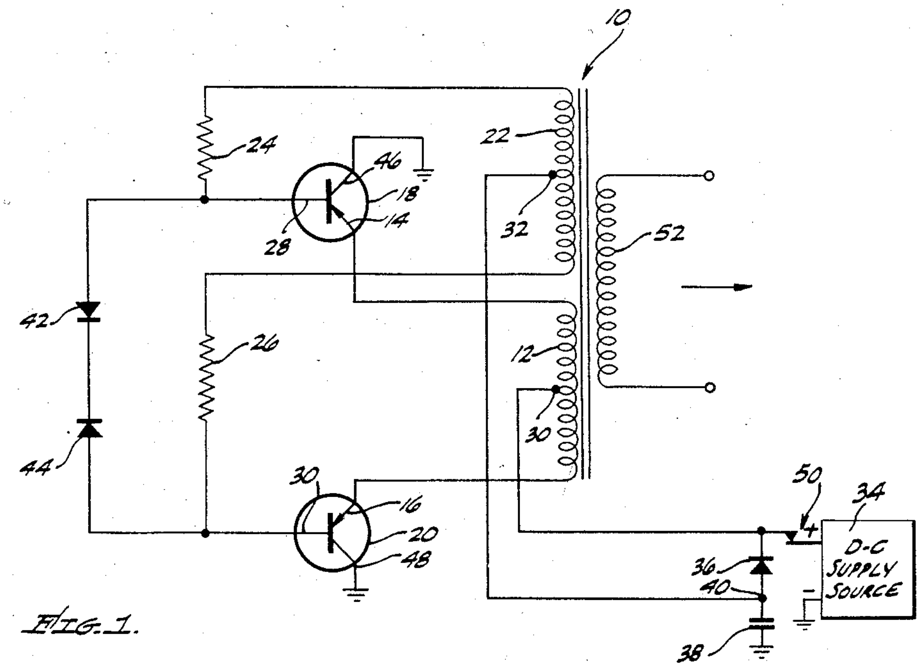

This invention relates to oscillators, and more particularly to an improved saturable-core oscillator and means for regulating the output voltage wave thereof.

As is well known, the output of a saturable-core oscillator will, in the absence of regulation of the D.-C. supply voltage, vary in magnitude with fluctuations in the supply voltage, and the frequency of the output wave will be proportional to such voltage. Additionally, where transistors are used in saturable-core oscillators, it is essential for effective heat dissipation that the transistors be connected thermally to the chassis of the equipment. It is also desirable to be able to connect the transistors to the chassis electrically, as by so doing a better thermal connection is achieved. Further, and also of great importance, it is desirable that power dissipation be accomplished in a manner so as to avoid excessive heating of components, particularly the transistors used for that purpose.

It is an object of this invention to provide an improved saturable-core oscillator and regulating means to insure that its output voltage will be constant despite fluctuations in the D.-C. supply voltage, and in which excessive heat dissipation in individual components is avoided.

It is another object of this invention to provide a self-regulated saturable-core transistor oscillator, comprising a minimum number of component parts of simple design, and in which the life of a component is not shortened by high heat dissipation.

The above and other objects and advantages of this invention will become apparent from the following description, taken in conjunction with the accompanying drawing, which illustrates one embodiment of the invention. The scope of the invention is pointed out in the appended claims. In the drawing, Fig. 1 is a schematic diagram of a saturable-core transistor oscillator having regulating means, in accordance with this invention, and Fig. 2 illustrates wave forms to aid in explaining the operation of the circuit of Fig. 1.

Briefly, in accordance with this invention, center-taps of the primary and feedback windings of a saturable-core are coupled to an unregulated D.-C. supply source, the primary winding connecting the emitters and the feedback winding connecting the bases of a pair of transistors; the collectors are connected to a point of reference or ground potential. A pair of back-to-back diodes connected between the base electrodes of the transistors serve to prevent the voltages at the base electrodes from exceeding a predetermined level, and also to insure that power dissipation will be divided equally between the transistors.

Figure 2:
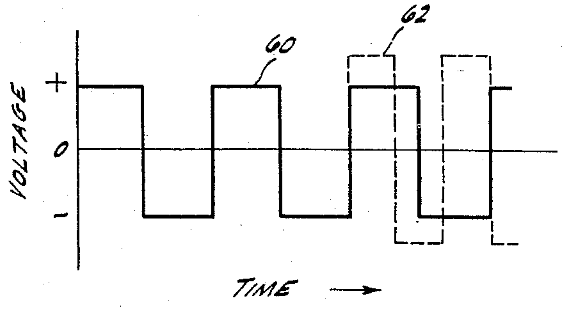

Referring to Fig. 1, a saturable-core transformer 10 has a primary winding 12, the ends of which are connected to the emitter electrodes 14, 16 of a pair of transistors 18, 20 and a feedback winding 22, which has a greater number of turns than the primary winding, having its ends connected through respective dropping resistors 24, 26 to the base electrodes 28, 30 of such transistors. The center taps 30, 32 of primary and feedback windings 12, 22 are coupled to a D.-C. supply source 34, which may be unregulated, through a bias circuit which includes a diode 36 and capacitor 38 connected across the supply source 34, such diode being connected in the forward direction between its junction 40 with capacitor 38 and the positive terminal of source 34; thus, center taps 30, 32 are connected across diode 36. The base electrodes 28, 30 are connected through a pair of diodes 42, 44 which are connected in back-to-back relation. The collector electrodes 46, 48 of the transistors are connected to reference or ground potential.

Bias circuit 36—38 is effective upon connecting the source 34 thereto, as through a switch 50, to establish a forward bias for one of the transistors for initiating oscillations. By virtue of unsymmetrical characteristics of the various components associated with the transistors, and of the transistors themselves, this results in the emitter-base potential difference for one transistor being sufficient to effect its conduction. Following this, the well known effect of the typical saturable core takes over to sustain oscillations, i. e., saturation of the core when one transistor is conducting, followed by collapse of the magnetic field to effect conduction of the other transistor, whereby the transistors are alternately conducting and a cyclical voltage is developed across the secondary winding 52 of transformer 10.

In Fig. 2, capacitor 38 is charged to a point where junction 40 is substantially at the potential of the positive terminal of source 34. In other words, after capacitor 38 becomes charged, the situation is as though both center taps 30, 32 were connected to the positive terminal of the source. It should be noted that the bias circuit 36—38 is desirable for initiating oscillations under rather low temperature conditions. If the oscillator were to be operated at room temperature, the bias circuit could be eliminated; where no bias circuit is used, center tap 32 is connected directly to center tap 30.

Diodes 42 and 44 represent voltage standards or voltage reference devices which function to maintain the base potentials at a constant value. This is accomplished by using diodes having reverse current thresholds at the level at which the base potentials are to be maintained, e. g., Zener diodes. Should the base potential of the conducting transistor tend to exceed the desired level, that diode which is connected in the reverse direction with respect to that base is rendered conducting, whereupon the base potential remains unchanged. The circuit in which the conduction of either diode takes place includes feedback winding 32, dropping resistors 24, 26, and of course the remaining diode. Reference here, of course, is the positive terminal.

Another important feature of this invention resides in the fact that diodes 42, 44 enable power dissipation to be divided between the transistors. Assume a source voltage of 21 volts and that voltage drops result in placing the emitter and base electrodes of the conducting transistor at —20.5 volts and —20.8 volts, respectively. Assume also that the reverse current threshold for each of diodes 42, 44 corresponds to a base voltage of —20.8 volts, and that the transistor is fully conductive with a 0.3-volt emitter-base potential difference. Now assume that the source voltage suddenly rises to 31 volts. Since the effect of diodes 42, 44 is to keep the base potential at —20.8 volts, as previously explained, any increase in the source voltage is reflected in a tendency to decrease base current, whereupon the collector impedance increases to provide the additional voltage drop of 10 volts necessary for the emitter-base potential difference to remain the same.

On the following half-cycle, the other transistor functions to dissipate power in this same manner. Therefore, the dissipation of power which must be effected upon an increase in source voltage is divided equally between the transistors. Thus, no one element is required to dissipate unwanted power continuously, and the transistors therefore are not subjected to high heat dissipation such as would shorten operating life.

Referring to Fig. 2, the self-regulating feature of the oscillator of this invention results in an output voltage 60 of constant amplitude. Dotted wave 62 illustrates the increase in magnitude and frequency that would result without regulation.

The circuit of this invention has been described and illustrated as using p-n-p junction transistors. It will be apparent that n-p-n junction transistors could be employed, it being necessary only to reverse the potentials dealt with. Obviously, also, each of the diodes 42, 44 could be reversed from the position shown in Fig. 1 without altering their function. Finally, in bias circuit 36—38, either or both diode 36 and capacitor 38 may be replaced with resistors, the values of which would depend upon the starting characteristics desired for the particular temperature conditions under which the transistors are to operate.

What is claimed is:

1. A self-regulated oscillator comprising a saturable-core transformer having primary and feedback windings to be connected to electronic devices for developing oscillations across a secondary winding of a frequency depending upon the period of build-up and collapse of the magnetic field in the transformer core, means to effect development of oscillations of constant magnitude from an unregulated D.-C. supply source including center-tap connections from the primary and feedback windings to the supply source, first and second transistors each having base electrodes coupled to respective ends of the feedback winding and emitter electrodes coupled to respective ends of the primary winding, collector electrodes for said transistors connected to a point of reference potential, a pair of diodes connected in back-to-back relation between said base electrodes, said diodes being characterized by reverse current flow therethrough when the base potentials tend to exceed a predetermined level, and said diodes effecting power dissipation through the emitter-collector current paths of said transistors when the source voltage exceeds a predetermined level.

2. An oscillator in accordance with claim 1, including means coupled between the source and center-tap connections to establish an initial emitter-base forward bias on one of the transistors for initiating oscillations.

3. In combination, a saturable-core oscillator having primary feedback and secondary windings, a pair of transistors each having emitter-collector and emitter-base current paths, the ends of said primary winding being connected through said emitter-collector paths to a point of reference potential and through said emitter-base paths to the ends of said feedback winding, center-tap connections from each of said primary and feedback windings to a source of D.-C. supply voltage, voltage reference means connected between said emitter-base paths and operative to prevent emitter-base potentials from exceeding predetermined levels, and bias means coupled between said source and said center-tap connections to aid in establishing a forward emitter-base bias for one transistor for initiating oscillations when said source is first connected in circuit with said center-tap connections.

References Cited in the file of this patent

UNITED STATES PATENTS

| | | |
|---|---|---|
| 2,716,729 | Shockley | Aug. 30, 1955 |
| 2,748,274 | Pearlman | May 29, 1956 |
| 2,783,384 | Bright et al. | Feb. 26, 1957 |